US007073034B2

(12) United States Patent
Kirsch (10) Patent No.: US 7,073,034 B2
(45) Date of Patent: Jul. 4, 2006

(54) SYSTEM AND METHOD FOR ENCODING PROCESSING ELEMENT COMMANDS IN AN ACTIVE MEMORY DEVICE

(75) Inventor: Graham Kirsch, Tadley (GB)

(73) Assignee: Micron Technology, Inc., Boise, ID (US)

( * ) Notice: Subject to any disclaimer, the term of this patent is extended or adjusted under 35 U.S.C. 154(b) by 409 days.

(21) Appl. No.: 10/629,156

(22) Filed: Jul. 28, 2003

(65) Prior Publication Data
US 2004/0193784 A1    Sep. 30, 2004

(30) Foreign Application Priority Data
Mar. 27, 2003  (GB) ................................ 0307087.7

(51) Int. Cl.
*G06F 12/00*    (2006.01)
(52) U.S. Cl. ...................................... 711/154; 712/208
(58) Field of Classification Search ................ 711/125; 712/200–219, 220, 300
See application file for complete search history.

(56) References Cited
U.S. PATENT DOCUMENTS
4,835,738 A    5/1989  Niehaus et al. ............. 711/154

5,867,681 A    2/1999  Worrell et al. .............. 712/208
5,923,862 A    7/1999  Nguyen et al. ............. 712/208

FOREIGN PATENT DOCUMENTS
GB        2 308 470 A     6/1997

*Primary Examiner*—Nasser Moazzami (74) *Attorney, Agent, or Firm*—Dorsey & Whitney, LLP (57) ABSTRACT

A command engine for an active memory receives high level tasks from a host and generates corresponding sets of either DRAM control unit ("DCU") commands to a DRAM control unit or array control unit ("ACU") commands to a processing array control unit. The DCU commands include memory addresses, which are also generated by the command engine, and the ACU command include instruction memory addresses corresponding to an address in the ACU where processing array instructions are stored. The processing array instructions are used to address a decode SRAM containing microinstructions that are used to control the operation of an array of processing elements. The number of bits in each of the microinstructions is substantially greater than the number of bits in the corresponding processing array instruction. The decode SRAM is preferably loaded prior to operation of the active memory based on the operations to be performed by the processing elements.

52 Claims, 5 Drawing Sheets

SYSTEM AND METHOD FOR ENCODING PROCESSING ELEMENT COMMANDS IN AN ACTIVE MEMORY DEVICE

TECHNICAL FIELD

The invention relates memory devices, and, more particularly, to a system and method for internally supplying commands to processing elements in an active memory device.

BACKGROUND OF THE INVENTION

A common computer processing task involves sequentially processing large numbers of data items, such as data corresponding to each of a large number of pixels in an array. Processing data in this manner normally requires fetching each item of data from a memory device, performing a mathematical or logical calculation on that data, and then returning the processed data to the memory device. Performing such processing tasks at high speed is greatly facilitated by a high data bandwidth between the processor and the memory devices. The data bandwidth between a processor and a memory device is proportional to the width of a data path between the processor and the memory device and the frequency at which the data are clocked between the processor and the memory device. Therefore, increasing either of these parameters will increase the data bandwidth between the processor and memory device, and hence the rate at which data can be processed.

A memory device having its own processing resource is known as an active memory device. Conventional active memory devices have been provided for mainframe computers in the form of discrete memory devices provided with dedicated processing resources. However, it is now possible to fabricate a memory device, particularly a dynamic random access memory ("DRAM") device, and one or more processors on a single integrated circuit chip. Single chip active memory devices have several advantageous properties. First, the data path between the DRAM device and the processor can be made very wide to provide a high data bandwidth between the DRAM device and the processor. In contrast, the data path between a discrete DRAM device and a processor is normally limited by constraints on the size of external data buses. Further, because the DRAM device and the processor are on the same chip, the speed at which data can be clocked between the DRAM device and the processor can be relatively high, which also maximizes data bandwidth. The cost of an active memory device fabricated on a single chip can is also less than the cost of a discrete memory device coupled to an external processor.

Although a wide data path can provide significant benefits, actually realizing these benefits requires that the processing bandwidth of the processor be high enough to keep up with the high bandwidth of the wide data path. One technique for rapidly processing data provided through a wide data path is to perform parallel processing of the data. For example, the data can be processed by a large number of processing elements ("PEs"), each of which processes a respective group of the data bits. One type of parallel processor is known as a single instruction, multiple data ("SIMD") processor. In a SIMD processor, a large number of PEs simultaneously receive the same instructions, but they each process separate data. The instructions are generally provided to the PE's by a suitable device, such as a microprocessor. The advantages of SIMD processing are simple control, efficient uses of available data bandwidth, and minimal logic hardware overhead.

An active memory device can be implemented by fabricating a large number of SIMD PEs and a DRAM on a single chip, and coupling each of the PEs to respective groups of columns of the DRAM. Instructions are provided to the PEs from an external device, such as a host microprocessor. The number of PE's included on the chip can be very large, thereby resulting in a massively parallel processor capable of processing vast amounts of data. However, this capability can be achieved only by providing instructions to the PEs at a rate that is fast enough to allow them to operate at their maximum speed.

One technique for providing instructions to the PEs is to supply high level commands to an processing array control unit ("ACU"), decode these commands in the ACU to generate PE microinstructions, and pass the PE microinstructions to the PEs in the array. However, the microinstructions provided to the PEs consist of a large number of bits so that each of the microinstructions can have any of a large number of possible values. For example if the PE microinstructions are 52 bits wide, then the instructions can have $4.5 \times 10^{15}$ possible values. If a program memory for the ACU was used in a typical manner to store these microinstructions (in which a program memory stored a corresponding microinstruction at each address), the required size of the program memory, which is normally a random access memory ("RAM"), would be very large and inefficiently used.

There is therefore a need for a system and method for generating and then decoding SIMD PE microinstructions in a manner that allows a relatively small amount of circuitry to operate at a relatively high speed.

SUMMARY OF THE INVENTION

An integrated circuit active memory device includes a command engine that receives task command from a host and generates corresponding sequences of array control unit commands. The active memory device also includes an array control unit coupled to the command engine to receive the array control unit commands. The array control unit generates respective sequences of array control program instructions responsive to each of the array control unit commands. A decode memory device is addressed by at least a portion of the instructions to read respective processing element microinstructions, which are composed of a substantially larger number of bits than the number of bits in the portion of the instruction used to address the decode memory. The decode memory device is preferably loaded with instructions based on the operations that will be performed by the active memory device. As a result, the decode memory need only be large enough to store the relatively few microinstructions that will actually be used, and the size of each processing element instruction can be correspondingly smaller. Additional instructions that are not stored in the decode memory can be created by combining portions of several of the instructions. The processing element microinstructions are executed by an array of processing elements.

DETAILED DESCRIPTION OF THE INVENTION

Figure 1:
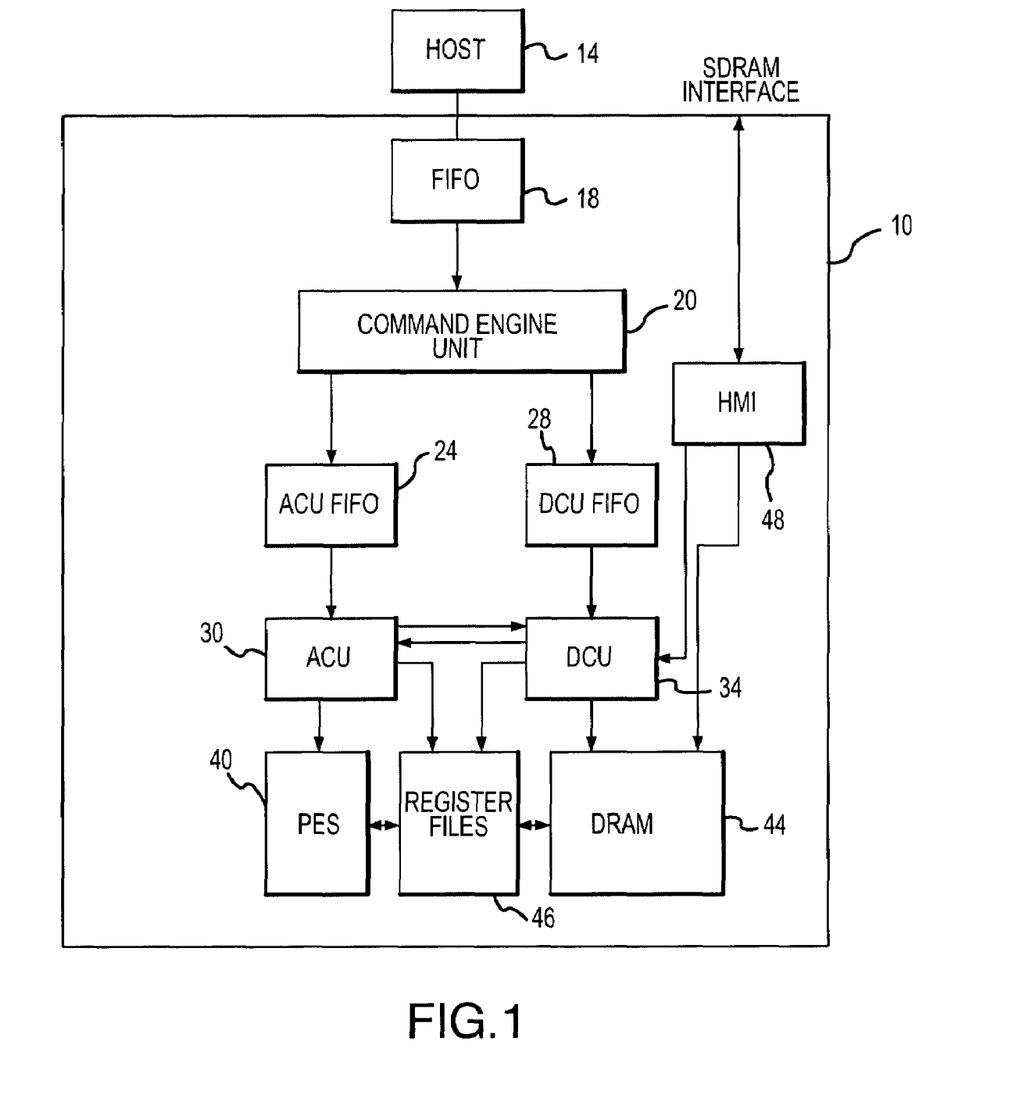
FIG. 1 is a block diagram of an active memory device according to one embodiment of the invention.

FIG. 1 shows an active memory device 10 according to one embodiment of the invention. The memory device 10 is coupled to a host 14, such as a microprocessor, although it may be coupled to other devices that supply high-level instructions to the memory device 10. The memory device 10 includes a first in, first out ("FIFO") buffer 18 that receives high-level tasks from the host 14. Each task includes a task command and may include a task address. The received task commands are buffered by the FIFO buffer 18 and passed to a command engine 20 at the proper time and in the order in which they are received. The command engine 20 generates respective sequences of commands corresponding to received task commands. These commands are at a lower level than the task commands received by the command engine 20. The commands are coupled from the command engine 20 to either an array control unit ("ACU") FIFO buffer 24 or a DRAM control unit ("DCU") FIFO buffer 28 depending upon whether the commands are array processing commands or memory commands. If the commands are array processing commands, they pass to the ACU FIFO buffer 24 and then from the FIFO buffer 24 to a processing array control unit ("ACU") 30. If the commands are memory commands, they are passed to the DCU FIFO buffer 28 and then to a DRAM Control Unit ("DCU") 34.

As explained in greater detail below, the ACU 30 executes intrinsic routines each containing several microinstructions responsive to commands from the FIFO buffer 24, and these microinstructions are executed by an array of PEs 40. The PE's operate as SIMD processors in which all of the PEs 40 receive and simultaneously execute the same microinstructions, but they do so on different data or operands. In the embodiment shown in FIG. 1, there are 256 PE's 40 each of which is coupled to receive 8 bits of data from the DRAM 44 through register files 46. In the embodiment shown in FIG. 1, the DRAM 44 stores 16 M bytes of data. However, it should be understood that the number of PEs used in the active memory device 10 can be greater or lesser than 256, and the storage capacity of the DRAM 44 can be greater or lesser than 16 Mbytes.

Different intrinsic routines containing different microinstructions are issued by the ACU 30 for different commands received from the FIFO buffer 24. As also explained below, the DCU 34 issues memory commands and addresses responsive to commands from the DCU FIFO buffer 28. In response, data are either read from a DRAM 44 and transferred to the register files 46, or written to the DRAM 44 from the register files 46. The register files 46 are also available to the PE's 40. The ACU 30 and the DCU 34 are coupled to each other so the operation of each of them can be synchronized to the other. The ACU 30 and DCU 34 are also coupled directly to the register files 38 so that they can control their operation and timing.

As mentioned above, there are a large number of possible PE microinstructions which requires a corresponding large number of bits in addresses used to select the PE microinstructions. These large PE microinstructions could be generated by the ACU 30 and then passed to the PEs 40 where the microinstructions would be decoded. However, the size of circuitry used to generate these large PE microinstructions would be correspondingly large, which would cause the circuitry to be inefficiently used. As explained in greater detail below, the ACU 30 avoids this problem by issuing microinstructions having relatively few bits-corresponding to the relatively few instructions actually used by the PEs 40 during an operation. An array decoder is then used to generate PE microinstructions that are executed by the PEs 40 from the instructions generated by the ACU 30. Therefore, the required size and complexity of circuitry in the ACU 30 to generate instructions must only be as large as the number of PE microinstructions that are executed by the PEs 40 during an operation. More specifically, in the embodiment of FIG. 1, the PE microinstructions each consist of 52 bits, yet in a typical set of routines only about 1,000–5,000 of these PE microinstructions will generally be used. As a result, any of these relatively small number of PE microinstructions can be selected using only about 10–13 bits. One embodiment for generating and decoding PE microinstructions according to the present invention will be described in greater detail below.

With further reference to FIG. 1, the DRAM 44 may also be accessed by the host 14 directly through a host/memory interface ("HMI") port 48. The HMI port 48 is adapted to receive a command set that is substantially similar to the command set of a conventional SDRAM except that it includes signals for performing a "handshaking" function with the host 14. These commands include, for example, ACTIVE, DEACTIVATE, READ, WRITE, etc. In the embodiment shown in FIG. 1, the HMI port 48 includes a 32-bit data bus and a 14-bit address bus, which is capable of addressing 16,384 pages of 256 words. The address mapping mode preferably is configurable to allow data to be accessed as 8, 16 or 32 bit words.

In a typical processing task, data read from the DRAM 44 are stored in the register files 46. The data stored in the register files 46 are then transferred to the PEs 40 where they become one or more operands for processing by the PEs 40. Groups of data bits read from or written to each set of DRAM columns are processed by respective PEs 40. The data resulting from the processing are then transferred from the PEs 40 and stored in the register files 46. Finally, the results data stored in the register files 46 are written to the DRAM 44.

The PEs 40 operate in synchronism with a processor clock signal (not shown in FIG. 1). The number of processor clock cycles required to perform a task will depend upon the nature of the task and the number of operands that must be fetched and then stored to complete the task. In the embodiment of FIG. 1, DRAM operations, such as writing data to and reading data from the DRAM 44, requires about 16 processor clock cycles. Therefore, for example, if a task requires transferring three operands into and of the DRAM 44, the task will require a minimum of 48 cycles.

Figure 2:
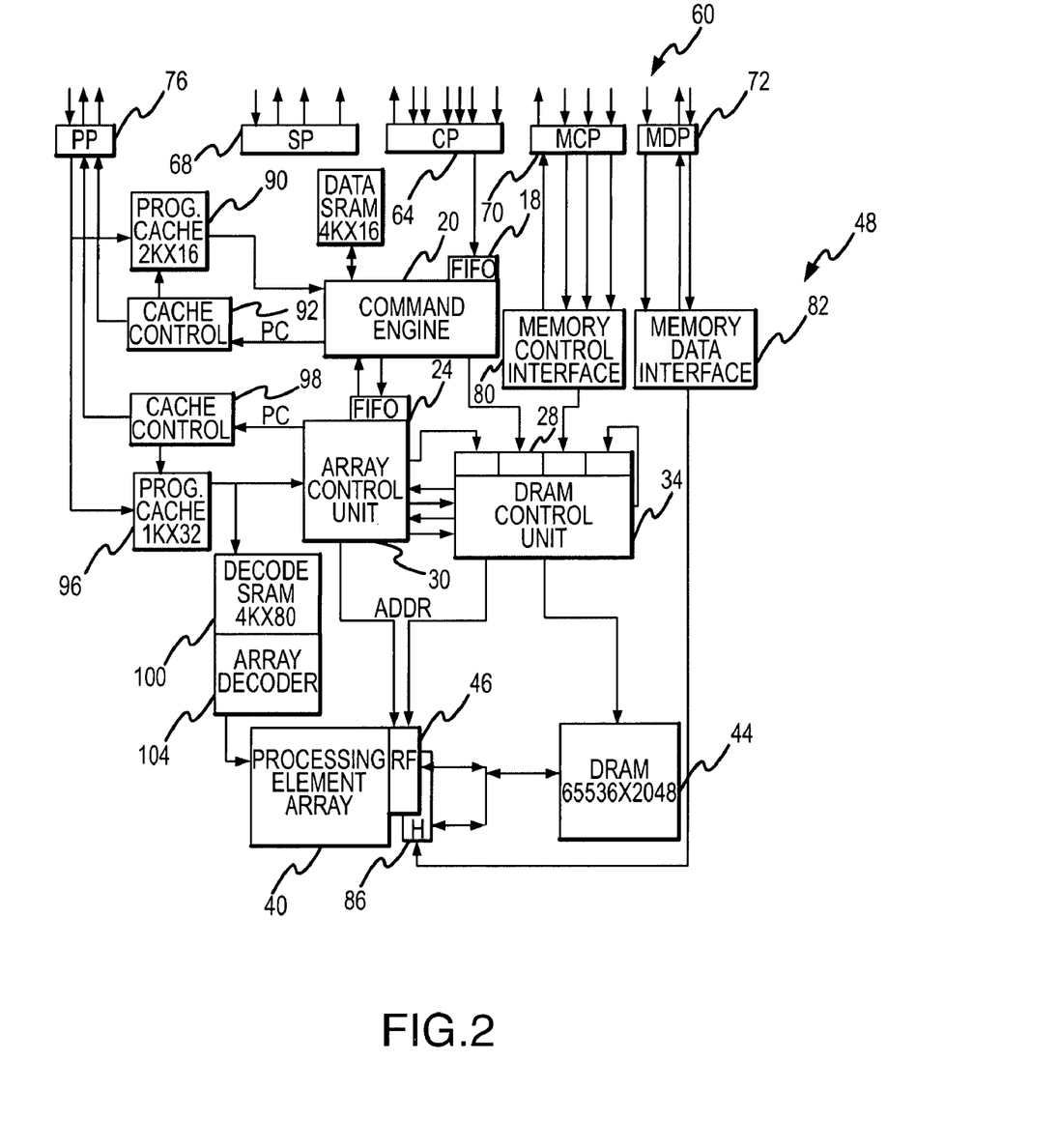
FIG. 2 is a more detailed block diagram of an active memory device according to another embodiment of the invention.

One embodiment 60 of an active memory 60 is shown in FIG. 2 in greater detail than the active memory 10 is shown in FIG. 1. However, components shown in FIG. 2 that are common to those in FIG. 1 have been provided with the same reference numerals. The active memory 60 includes five ports, namely a control port 64, a status port 68, a memory control port 70, a memory data port 72 and a program I/O port 76. The memory control port 70 and data port 72 are coupled to a memory control interface 80 and a memory data interface 82, which correspond to the host/memory interface ("HMI") 48 shown in FIG. 1. As explained above with reference to FIG. 1, the control and data interfaces 80, 82, respectively, provide an interface to the DRAM 44 that is similar to an interface to a conventional synchronous DRAM. To access data within the DRAM 44 using the interfaces 80, 82, an external device activates a page of data responsive to a memory command issued to the memory control interface 80 through the memory control port 70. The address of the page corresponds to an addresses issued to the memory data interface 82 through the memory data port 72. The data and address are then stored in H-registers 86, which are preferably random access memory ("RAM") devices. Addresses stored in the H-registers 86 are then coupled to the DRAM 44, and data stored in the H-registers 86 are coupled to and from the DRAM 44. The H-registers 86 are preferably implemented as 256 dual port 32×8 SRAM devices, one of which is provided for each PE 40. The H-registers 86 also store an active page of data thereby leaving the DRAM 44 available for other accesses. The operation of the H-registers 86 preferably is controlled by the DCU 34.

The activation and deactivation times of the DRAM 44 will generally require a fixed number of clock cycles. However, the activation and deactivation times of the memory control port 70 may take a variable number of clock cycles to complete because an internal operation within the active memory device 60 may be in progress. However, a ready ("rdy") signal is provided through the control port 70 to allow an external device (not shown) to detect when the processing of a memory command has been completed. Alternately, a fixed, sufficiently long delay time could be provided to ensure that the processing of a memory command has been completed before an external device began accesses the DRAM 44. The DRAM may be refreshed either internally by conventional means or externally through the memory control port 70.

Once a page in the DRAM 44 has been activated it can be written to and read from through a data port, which, in the embodiment of FIG. 2, consists of four 8-bit data ports each of which is capable of streaming data into and out of the H-registers 86 and the register files 46. Thus, each 8-bit data port serves one-quarter of the PEs 40. The data stored in the DRAM 44 is updated when a page stored in the H-registers 86 is transferred. In the memory device 60 of FIG. 2, up to 4 active pages of data can be stored in the H-registers at the same time, thereby allowing multiple external devices (not shown) to independently access the DRAM 44.

The command port 64 operates as a synchronous, write-only interface having 16 data bits ("Data"), a 2-bit function field ("fri"), a 2-bit tag field ("tag"), and a 2-bit device select field ("cs"). The command port 64 preferably operates at the clock frequency of the PEs 40. The cs field selects a command for execution either by the command engine 20, the ACU 30 or the DCU 34. In the embodiment shown in FIG. 2, a device select "cs" value of 0 causes a command to be executed by the command engine 20, a cs value of 1 causes a command to be executed by the ACU 30, and a cs value of 2 causes a command to be executed by the DCU 34. The tag field is used only for handshaking functions in issuing commands directly to the ACU 30 and the DCU 34. One of the tags is used as a signal tag to indicate the presence of a command at the control port 64 and the other tag is used as a wait tag to cause an external device to hold off issuing additional commands. A write input ("w") strobes the command into the FIFO 18, which stores the commands until they are executed by the command engine 20. As a result, burst commands can be issued to the active memory device 60 at a rate that is faster than they can be executed.

The status port 68 is a synchronous, read-only port that outputs an address ("Addr") for the purpose reading status data ("Data") from the memory device 60, FIFO flags that control the operation to of external FIFOs (not shown), and an interrupt output ("intr") that is used to alert the host 14 or other external device to several conditions. Like the command port 64, the status port 68 preferably operates at the clock frequency of the PEs 40.

The command engine 20 receives high level task commands from the host 14, decomposes them in to a stream of lower level calls to intrinsic routines, which the command engine 20 sends to the ACU 30 for execution. The command engine 20 may alternatively send signals to the DCU 34 for DRAM transfer operations. Each of the task commands is generally a command to perform a specific operation on a block of data stored in the DRAM 44. The command engine 20 then generates a stream of commands to perform the task. In operation, the command engine 20 executes a program stored in a program cache 90, which is controlled by a cache control 92. The cache control 92, in turn, is controlled by task control signals from the command engine 20. For example, the command engine 20 may couple task control signals to the cache control 92 corresponding to a jump command, which will cause an internal program counter (not shown) to be reset to a jump address. The program cache 90 then passes to the command engine 20 an instruction that is stored at a location corresponding to the jump command. High-level commands in the program executed by the command engine 20 are coupled to the command engine 20 from the command port 64. The command engine 20 interprets these commands and then rapidly generates corresponding command sequences. These command sequences are passed to the ACU 30 or the DCU 34, depending upon the state of the cs bits in the command received at the command port 64. The command engine 20 also maintains addresses for operand placement in the register files 46, and enable access to resources associated with the command engine, such as the program cache 90, as previously explained.

The ACU 30 is preferably a simple 16-bit processor that operates in a manner similar to the operation of the command engine 20 to control the processing elements 40. More specifically, the ACU executes instructions stored in a program memory 96, which is accessed by a cache control 98. The cache control 98 is, in turn, controlled by Array Control signals received from the ACU 30. Each instruction stored in the program memory 96 is preferably 32 bits wide. Half, i.e., 16, of these bits are used to control the operation of the ACU 30, and 12 of the other 16 bits are used for generating the microinstructions that are used to control the PEs 40, as explained in greater detail below. In operation, the ACU 30 receives sequences of commands from the command engine 20, interprets each of the commands in each sequence, and rapidly generates corresponding sequences of microinstructions for execution by the PEs 40.

One of the potential problems with the architecture shown in FIG. 2 stems from the relatively large size of the microinstructions the ACU 30 must pass to a decoder in the PEs 40 to select each of a very large number of possible microinstructions. As previously mentioned, since each of the microinstructions can have any one of a large number of possible values, the PE microinstructions provided by the ACU 30 must consist of a large number of bits. For example if the microinstructions can have $4.5 \times 10^{15}$ possible values, the PE microinstructions must be 52 bits wide. In the embodiment of FIG. 2, each of the microinstructions passed to the PEs 40 is composed of 80 bits, thereby making the number of microinstructions even more immense. However, as mentioned above, the number of microinstructions actually used by the PEs 40 is relatively small, thus making it possible to compress or encode the microinstructions generated by the ACU 30. To take advantage of this capability, a Decode SRAM 100 is provided that generally stores only those microinstructions that will be executed by the PEs 40. Therefore, the instructions generated by the ACU 30, or more specifically the program cache 96 for the ACU 30, must include only the number of bits needed to address the relatively few storage locations in the Decode SRAM 100. The Decode SRAM 100 is preferably a 4096×80 bit SRAM, although other sizes and configurations can be used. Each PE microinstruction required during the operation of the PEs 40 is stored in a different location in the Decode SRAM 100. In the embodiment of FIG. 2, only 12 bits are needed to address the Decode SRAM 100. The Decode SRAM 100 then outputs an 80-bit microinstruction, which is decoded by an Array Decoder 104 to provide control signals to the PEs 40.

The program caches 90, 96 are programmed through the program I/O port 76 prior to operating of the active memory device 60 by suitable means, such as from the host 14 (FIG. 1). Similarly, the decode SRAM 100 is programmed prior to operation with the microinstructions that will be used during processing. The decode SRAM 100 is preferably programmed through the control port 64. The PE microinstructions can be stored in the Decode SRAM 100 can be compiled as part of a program linking process so that the contents of the Decode SRAM 100, as well as the contents of the program caches 90, 96 can vary depending upon the program being executed by the active memory device 60. The operation of the Decode SRAM 100 will be explained in greater detail in connection with FIG. 3.

The DCU 34 controls the operation of the DRAM 44, and arbitrates between requests for DRAM access, which may come from any of four sources. These four sources are the command engine 20, which can request access to the DRAM 44 responsive to instructions in the program it is executing, the ACU 30, which can directly access the DCU 34, the memory command port 70, which can also directly access the DCU 34, and DRAM 44, which can access the DCU 34 to request a DRAM refresh. In the embodiment shown in FIG. 2, the DRAM 44 includes 16 65536×128 arrays. Each of the arrays is accessed by 16 PEs 40, so that 256 PEs 40 are included in the active memory device 60. The DRAM 44 operates synchronously at either the same or half the frequency of the PEs 40. However, different architectures with different numbers of PEs 40, different sizes of DRAMs, different clock speeds, etc. may alternatively be used.

Each of the PEs 40 is preferably a simple 8-bit integer processor containing an integer adder/multiplier (not shown) and logical unit (not shown). A rich register set and data shifting network is preferably provided to support floating point and divide operations. Each PE 40 has access to 128 bytes of data stored in the register files 46, which are preferably SRAM devices each having an 8-bit data bus. Each register file 46 is dual ported so that data can be transferred simultaneously into and out of the DRAM 44 without affecting the operation of the PEs 40. The PEs 40 execute the same microinstructions passed from the array decoder 104 each cycle. However, the PEs 40 can operate conditionally and can individually address the respective register files 46 that they access to provide the PEs 40 with some local autonomy.

In operation, the register files 46 function as the workspace for the PEs 40. Data are transferred into the register files 46 by the DRAM 44, transferred from the register files 46 to the PEs 40, and processed by the PEs to produce results. The results are then transferred from the PEs 40 to the register files 46, and then transferred from the register files 46 for storage in the DRAM 44.

The operation of the Decode SRAM 100 and array decoder 104 will now be explained in greater detail with reference to FIG. 3, which shows the program cache 96 for the ACU 30, an ACU instruction register 108 within the ACU 30 for storing each ACU instruction, an ACU decoder 110 within the ACU 30 for decoding the ACU instruction to control the operation of the ACU 30, and the Decode SRAM 100. As mentioned above, the program cache 96 stores 32 bit words. However, in normal use, 4 of these bits are not used, and each instruction from the program cache 96 consists of 28 bits, of which 16 bits are passed to the ACU instruction decoder 110 and 12 bits are passed to the Decode SRAM 100. As also mentioned previously, the Decode SRAM 100 is loaded with PE microinstructions before operation of the active memory device 60. At the time the program cache 96 is loaded with an assembled program, the Decode SRAM 100 is loaded with a table of PE microinstructions specific to that program. According to one embodiment of the invention, the program is processed preferably by an assembler to replace the PE microinstructions in the program with respective references to the address at which the corresponding PE microinstructions are stored in the Decode SRAM 100. The 28 bits of each instruction from the program cache 96 is thus decompressed to produce the 16 bits passed to the ACU instruction decoder 110 and 80 bits that are passed to the PE array decoder 104 (FIG. 2), for a total of 96 bits. Thus, the 28 bits stored in the program cache 96 are decompressed to 96 bits. As a result, the size of the program cache 96 can be smaller than the size of a cache that would be required to store 96 bits being only 28–32 bits wide.

Figure 3:
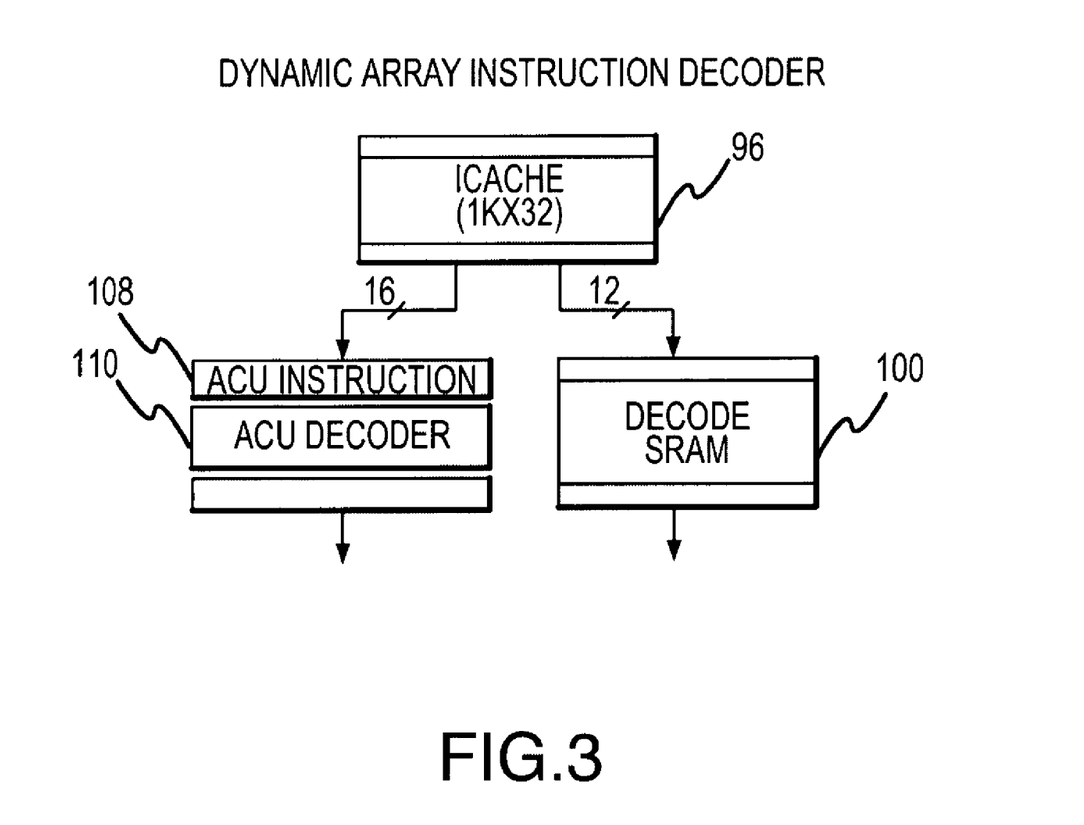
FIG. 3 is a block diagram of a system for decoding compressed instructions in the active memory device of FIG. 2 according to one embodiment of the invention.

One potential limitation of the embodiment shown in FIG. 3 is that a program may require more PE microinstructions than can be stored in the Decode SRAM 100. To avoid this limitation, an embodiment shown in FIG. 4 may be used to allow the program cache 96 to provide the extra 80-bit PE microinstructions needed by a program. The embodiment of FIG. 4 includes, in addition to the program cache 96 for the ACU 30, the ACU instruction register 108, the ACU instruction decoder 110, and the Decode SRAM 100, 5 instruction registers 116 and a multiplexer 118. In normal operation, the multiplexer 18 couples the PE microinstructions from the Decode SRAM 100 as explained above with reference to FIG. 3. However, when a PE microinstruction that is not stored in the Decode SRAM 100 must be executed, the 16 bits of each of 5 instructions from the ACU 30 are stored in respective instruction registers 116. The first of the instructions from the ACU 30 are stored in the first instruction register 116a, the second of the instructions from the ACU 30 are stored in the second instruction register 116b, and so forth until the fifth of the instructions from the ACU 30 are stored in the fifth instruction register 116e. The instruction registers 116 then collectively provide an 80-bit PE microinstruction, which the multiplexer 118 passes to the PEs 40. As a result, the PEs 40 can execute PE microinstructions even though those microinstructions have not been stored in the Decode SRAM 100.

A variety of means can be used to cause the active memory device to operate in either the normal mode or the extended instruction mode describe above. One technique will now be explained with reference to Table 1 below.

TABLE 1

| Inst. N − 1 | Normal ACU µInstr. | Normal PE µInstr. |
| Inst. N | NULL 2 | PE µInstr. Bits 79–64 |
| Inst. N + 1 | | PE µInstr. Bits 63–32 |
| Inst. N + 2 | | PE µInstr. Bits 31–0 |
| Inst. N + 3 | Normal ACU Instr. | Null PE µInstr. |

Figure 4:
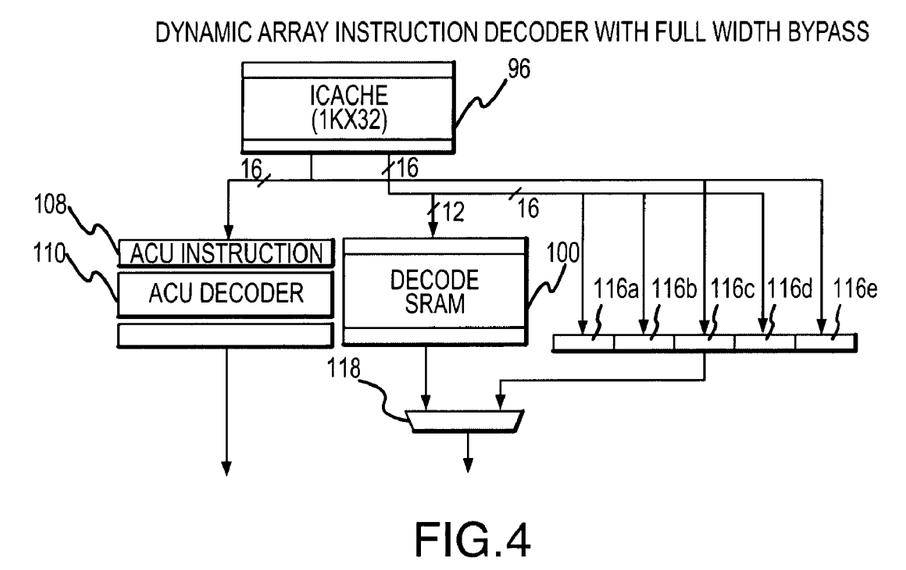
FIG. 4 is a block diagram of a system for decoding compressed instructions in the active memory device of FIG. 2 according to another embodiment of the invention.

According to one embodiment of the invention, Instruction N is a NULL2 ACU microinstruction that causes the ACU 30 to suspend the decode of the subsequent two ACU microinstructions N+1 and N+2. The NULL2 ACU microinstruction thus causes the ACU 30 and Decode SRAM 100 to operate in the extended instruction mode. The 16 PE microinstruction bits of Instruction N are stored in the first instruction register 116a and become PE microinstruction bits 79–64 of the subsequently assembled 80-bit PE microinstruction. The 16 ACU microinstruction bits and the 16 PE microinstruction bits of Instruction N+1 are stored in the second and third instruction registers 116b and 116c, respectively, and become PE microinstruction bits 63–32 of the 80-bit PE microinstruction. Finally, the 16 ACU microinstruction bits and the 16 PE microinstruction bits of Instruction N+2 are stored in the fourth and fifth instruction registers 116d and 116e, respectively, and become PE microinstruction bits 61–0 of the 80-bit PE microinstruction. At this point, the instruction registers 116a–e collectively output the 80-bit PE microinstruction, which is passed to the PEs 40 through the multiplexer 118. As shown in Table 1, the next instruction N+3 is a normal ACU microinstruction, which causes the ACU 30 to resume operation. The PE microinstruction portion of the N+3 instruction is a null because the PE's are not able to process a command until the ACU 30 has resumed operation.

Figure 5:
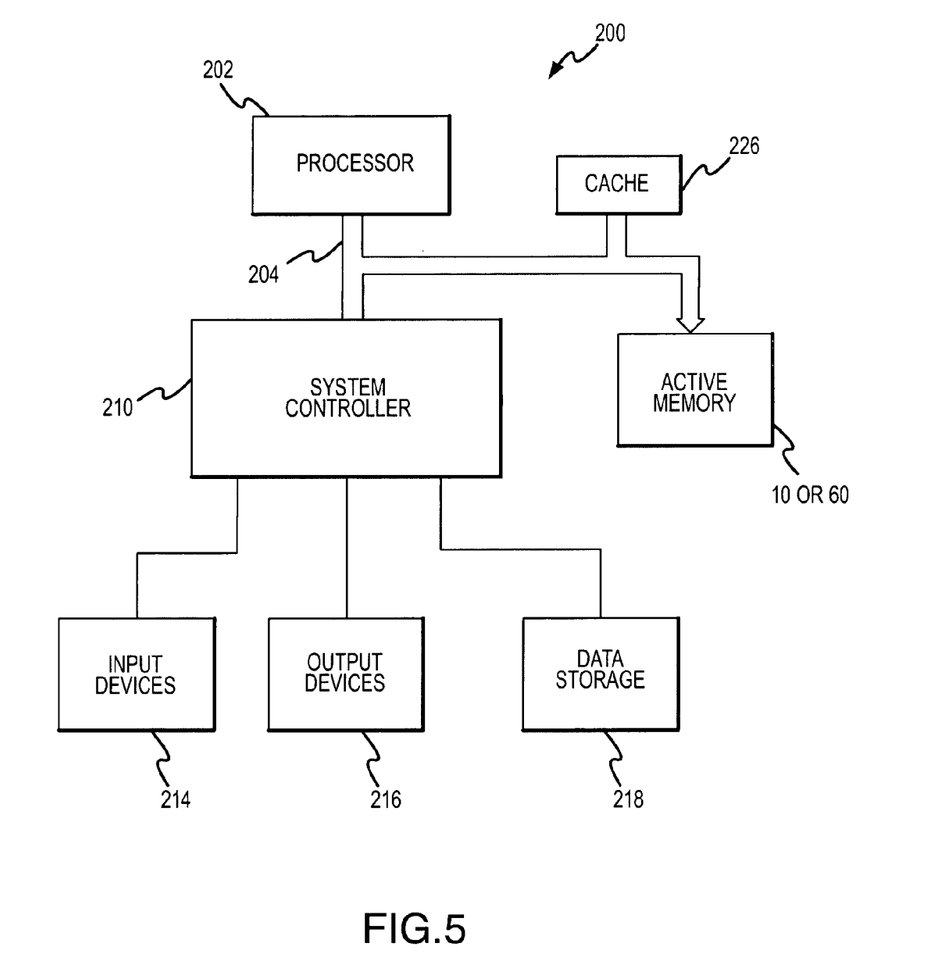
FIG. 5 is a block diagram of a computer system using the active memory devices of FIGS. 1 and 2 according to one embodiment of the invention.

A computer system 200 is shown in FIG. 5 using the active memory device 10 of FIG. 1, the active memory device 60 of FIG. 2, or some other active memory device according to the present invention. The computer system 200 includes a processor 202 for performing various computing functions, such as executing specific software to perform specific calculations or tasks. The processor 202 includes a processor bus 204 that normally includes an address bus, a control bus, and a data bus. In addition, the computer system 200 includes one or more input devices 214, such as a keyboard or a mouse, coupled to the processor 202 through a system controller 210 to allow an operator to interface with the computer system 200. Typically, the computer system 200 also includes one or more output devices 216 coupled to the processor 202 through the system controller 210, such output devices typically being a printer or a video terminal. One or more data storage devices 218 are also typically coupled to the processor 202 through the system controller 210 to store data or retrieve data from external storage media (not shown). Examples of typical storage devices 218 include hard and floppy disks, tape cassettes, and compact disk read-only memories (CD-ROMs). The processor 202 is also typically coupled to a cache memory 226, which is usually static random access memory ("SRAM"). The processor 202 is also coupled through the data bus of the processor bus 204 to the active memory device 10 so that the processor 202 can act as a host 14, as explained above with reference to FIGS. 1 and 2.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An integrated circuit active memory device comprising:
   a command engine operable to generate either respective sequences of array control unit commands or respective sequences of memory device control unit commands responsive to respective task commands applied to a task command input of the command engine;
   an array control unit coupled to receive the sequences of the array control unit commands from the command engine, the array control unit being operable to generate a respective sequence of processing element instructions responsive to each of the sequences of the array control unit commands;
   a memory device control unit coupled to receive the sequences of the memory device control unit commands from the command engine, the memory device control unit being operable to generate a respective sequence of memory commands responsive to each of the sequences of the memory device control unit commands;
   a decode memory device coupled to receive the sequences of the processing element instructions from the array control unit, the decode memory device storing a plurality of processing element microinstructions and being addressed by the sequences of the processing element instructions such that each of the processing element instructions accesses a location in the decode memory device where a respective processing element microinstruction is stored, each of the processing element microinstructions having a number of bits that is greater than the number of bits in the processing element instructions;
   a memory device having a data bus containing a plurality of data bus bits, the memory device being operable to receive the memory device control unit commands and couple write data to and read data from the memory device through the data bus; and
   an array of processing elements each of which is coupled to a respective group of the data bus bits of the memory device data bus, each of the processing elements having an instruction input coupled to receive the plurality of the processing element microinstructions from the decode memory device for controlling the operation of the processing elements.

2. The active memory device of claim 1 wherein the memory device comprises a random access memory device.

3. The active memory device of claim 2, wherein the decode memory device comprises a static random access memory device.

4. The active memory device of claim 1, further comprising:
   a plurality of instruction registers coupled to receive the processing element instructions from the array control unit, the instruction registers being operable to store a plurality of the processing element instructions and to simultaneously output the processing element instructions stored in the instruction registers as a processing element microinstruction; and
   a multiplexer having a first input coupled to the output port of the decode memory device to receive the processing element microinstructions from the decode memory device, a second input coupled to the instruction registers to receive the processing element micro instructions output from the instruction registers, and an output coupled to the instruction input of each of the processing elements.

5. The active memory device of claim 1 wherein the array control unit is further operable to generate an array control unit instruction along with each of the processing element instructions, the array control unit instruction controlling the operation of the array control unit.

6. The active memory device of claim 1 wherein the array control unit further comprises:
a program cache device containing a plurality of array control unit instructions, at least some of the array control unit instructions including an array control unit microinstruction and one of the processing element instructions, the array control unit microinstructions being passed to the array control unit to control the operation of the array control unit; and
a cache control device that is operable to address the program cache device responsive to control signals from the array control unit, at least some of the control signals being responsive to the sequences of the array control unit commands to cause the cache control device to access a specific location in the cache control device where an array control instruction is stored.

7. The active memory device of claim 6, further comprising a program port coupled to the program cache device, the program port receiving the array control unit instructions, and coupling the array control unit instructions to the program cache device to program the program cache device prior to operation of the array control unit.

8. The active memory device of claim 1, further comprising a program port coupled to the decode memory device, the program port receiving the processing element microinstructions and coupling the processing element microinstruction to the decode memory device to program the decode memory device prior to operation of the array control unit.

9. An integrated circuit active memory device comprising:
a command engine operable to generate either respective sequences of array control unit commands or respective sequences of memory device control unit commands responsive to respective task commands applied to a task command input of the command engine;
an array control unit coupled to receive the sequences of the array control unit commands from the command engine, the array control unit comprising:
a program cache device containing a plurality of array control unit instructions, at least some of the array control unit instructions including an array control unit microinstruction and a processing element instruction, the array control unit microinstructions being passed to the array control unit to control the operation of the array control unit; and
a cache control device that is operable to address the program cache device responsive to control signals from the array control unit, at least some of the control signals being responsive to the sequences of the array control unit commands to cause the cache control device to access a specific location in the cache control device where an array control instruction is stored;
a memory device control unit coupled to receive the sequences of the memory device control unit commands from the command engine, the memory device control unit being operable to generate a respective sequence of memory commands responsive to each of the sequences of the memory device control unit commands;
a decode memory device coupled to receive the processing element instructions from the program cache, the decode memory device storing a plurality of processing element microinstructions and being addressed by the processing element instructions such that each of the processing element instructions accesses a location in the decode memory device where a respective processing element microinstruction is stored, each of the processing element microinstructions having a number of bits that is greater than the number of bits in the processing element instructions;
a memory device having a data bus containing a plurality of data bus bits, the memory device being operable to receive the sequences of the memory commands and couple write data to and read data from the memory device through the data bus; and
an array of processing elements each of which is coupled to a respective group of the data bus bits of the memory device data bus, each of the processing elements having an instruction input coupled to receive the processing element microinstructions from the decode memory for controlling the operation of the processing elements.

10. The active memory device of claim 9, further comprising a program port coupled to the decode memory device, the program port receiving the processing element microinstructions and coupling the processing element microinstruction to the decode memory device to program the decode memory device prior to operation of the array control unit.

11. The active memory device of claim 9, further comprising a program port coupled to the program cache device, the program port receiving the processing element instructions and coupling the processing element instruction to the program cache device to program the program cache device prior to operation of the array control unit.

12. The active memory device of claim 9, further comprising a program port coupled to the program cache device and to the decode memory device, the program port receiving the processing element instructions and coupling the processing element instruction to the program cache device for storage in the program cache device prior to operation of the array control unit, the program port further receiving the processing element microinstructions and coupling the processing element microinstruction to the decode memory device for storage in the decode memory device prior to operation of the array control unit, the processing element microinstructions stored in the decode memory corresponding to the processing element instructions stored in the program cache device.

13. The active memory device of claim 9 wherein the decode memory device comprises a random access memory device.

14. The active memory device of claim 13 wherein the decode memory device comprises a static random access memory device.

15. The active memory device of claim 9, further comprising:
a plurality of instruction registers coupled to receive the processing element instructions from the array control unit, the instruction registers being operable to store at least a portion of each of a plurality of the processing element instructions and to simultaneously output the stored portions of the processing element instructions as a processing element microinstruction; and a multiplexer having a first input coupled to the output port of the decode memory device to receive the processing element microinstructions from the decode memory device, a second input coupled to the instruction registers to receive the processing element micro instructions output from the instruction registers, and an output coupled to the instruction input of each of the processing elements.

16. An integrated circuit single instruction multiple data processing device, comprising:
   a command engine operable to generate respective sequences of array control unit commands responsive to respective task commands applied to a task command input of the command engine;
   an array control unit coupled to receive the sequences of the array control unit commands from the command engine, the array control unit comprising:
      a program cache device containing a plurality of array control unit instructions, at least some of the array control unit instructions including an array control unit microinstruction and a processing element instruction, the array control unit microinstructions being passed to the array control unit to control the operation of the array control unit; and
      a cache control device that is operable to address the program cache device responsive to control signals from the array control unit, at least some of the control signals being responsive to the sequences of the array control unit commands to cause the cache control device to access a specific location in the cache control device where an array control instruction is stored;
   a decode memory device coupled to receive the processing element instructions from the program cache, the decode memory device storing a plurality of processing element microinstructions and being addressed by the processing element instructions such that each of the processing element instructions accesses a location in the decode memory device where a respective processing element microinstruction is stored, each of the processing element microinstructions having a number of bits that is greater than the number of bits in the processing element instructions; and
   an array of processing elements each of which is coupled to a respective group of the data bus bits of the memory device data bus, each of the processing elements having an instruction input coupled to receive the processing element microinstructions from the decode memory for controlling the operation of the processing elements.

17. The processing device of claim 16, further comprising a program port coupled to the decode memory device, the program port receiving the processing element microinstructions and coupling the processing element microinstruction to the decode memory device to program the decode memory device prior to operation of the array control unit.

18. The processing device of claim 16, further comprising a program port coupled to the program cache device, the program port receiving the processing element instructions and coupling the processing element instruction to the program cache device to program the program cache device prior to operation of the array control unit.

19. The processing device of claim 16, further comprising a program port coupled to the program cache device and to the decode memory device, the program port receiving the processing element instructions and coupling the processing element instruction to the program cache device for storage in the program cache device prior to operation of the array control unit, the program port further receiving the processing element microinstructions and coupling the processing element microinstruction to the decode memory device for storage in the decode memory device prior to operation of the array control unit, the processing element microinstructions stored in the decode memory corresponding to the processing element instructions stored in the program cache device.

20. The processing device of claim 16 wherein the decode memory device comprises a random access memory device.

21. The processing device of claim 20 wherein the decode memory device comprises a static random access memory device.

22. The processing device of claim 16, further comprising:
   a plurality of instruction registers coupled to receive the processing element instructions from the array control unit, the instruction registers being operable to store at least a portion of each of a plurality of the processing element instructions and to simultaneously output the stored portions of the processing element instructions as a processing element microinstruction; and
   a multiplexer having a first input coupled to the output port of the decode memory device to receive the processing element microinstructions from the decode memory device, a second input coupled to the instruction registers to receive the processing element micro instructions output from the instruction registers, and an output coupled to the instruction input of each of the processing elements.

23. An active memory control system, comprising:
   a first control device receiving task commands corresponding to respective active memory operations, the first control device being operable to generate either a respective set of memory commands or a respective set of processing commands responsive to each of the task commands;
   a second control device coupled to receive the memory commands from the first control device, the second control device being operable to generate a respective set of the memory device instructions responsive to each of the memory commands;
   a third control device coupled to receive the processing commands from the first control device, the third control device being operable to generate a respective set of the processing element instructions responsive to each of the processing commands;
   a decode memory device coupled to receive the processing element instructions from the third control device, the decode memory device storing a plurality of processing element microinstructions and being addressed by the processing element instructions such that each of the processing element instructions accesses a location in the decode memory device where a respective processing element microinstruction is stored, each of the processing element microinstructions having a number of bits that is greater than the number of bits in the processing element instructions.

24. The active memory control system of claim 23, wherein the decode memory device comprises a random access memory device.

25. The active memory control system of claim 24, wherein the decode memory device comprises a static random access memory device.

26. The active memory control system of claim 23, further comprising:
- a plurality of instruction registers coupled to receive the processing element instructions from the third control device, the instruction registers being operable to store a plurality of the processing element instructions and to simultaneously output the processing element instructions stored in the instruction registers as a processing element microinstruction; and
- a multiplexer having a first input coupled to the output port of the decode memory device to receive the processing element microinstructions from the decode memory device, a second input coupled to the instruction registers to receive the processing element micro instructions output from the instruction registers, the multiplexer being operable to couple either the first input or the second input to an output.

27. The active memory control system of claim 23 wherein the third control device is further operable to generate a control instruction along with each of the processing element instructions, the control instruction controlling the operation of the third control device.

28. The active memory control system of claim 23 wherein the third control device further comprises:
- a program cache device containing a plurality of instructions, at least some of the instructions including a control unit microinstruction and one of the processing element instructions, the control unit microinstructions being passed to the third control device to control the operation of the array control unit; and
- a cache control device that is operable to address the program cache device responsive to control signals from the third control device, at least some of the control signals being responsive to the control unit microinstruction to cause the cache control device to access a specific location in the cache control device where one of the instructions is stored.

29. The active memory control system of claim 28, further comprising a program port coupled to the program cache device, the program port receiving the instructions, and coupling the instructions to the program cache device to program the program cache device prior to operation of the third control device.

30. A computer system, comprising:
- a host processor having a processor bus;
- at least one input device coupled to the host processor through the processor bus;
- at least one output device coupled to the host processor through the processor bus;
- at least data storage device coupled to the host processor through the processor bus; and
- an active memory device, comprising:
  - a command engine operable to generate either respective sequences of array control unit commands or respective sequences of memory device control unit commands responsive to respective task commands applied to a task command input of the command engine;
  - an array control unit coupled to receive the sequences of the array control unit commands from the command engine, the array control unit being operable to generate a respective sequence of processing element instructions responsive to each of the sequences of the array control unit commands;
  - a memory device control unit coupled to receive the sequences of the memory device control unit commands from the command engine, the memory device control unit being operable to generate a respective sequence of memory commands responsive to each of the sequences of the memory device control unit commands;
  - a decode memory device coupled to receive the processing element instructions from the array control unit, the decode memory device storing a plurality of processing element microinstructions and being addressed by the processing element instructions such that each of the processing element instructions accesses a location in the decode memory device where a respective processing element microinstruction is stored, each of the processing element microinstructions having a number of bits that is greater than the number of bits in the processing element instructions;
  - a memory device having a data bus containing a plurality of data bus bits, the memory device being operable to receive the sequences of the memory commands and couple write data to and read data from the memory device through the data bus; and
  - an array of processing elements each of which is coupled to a respective group of the data bus bits of the memory device data bus, each of the processing elements having an instruction input coupled to receive the processing element microinstructions from the decode memory for controlling the operation of the processing elements.

31. The computer system of claim 30 wherein the memory device comprises a random access memory device.

32. The computer system of claim 31, wherein the decode memory device comprises a static random access memory device.

33. The computer system of claim 30, further comprising:
- a plurality of instruction registers coupled to receive the processing element instructions from the array control unit, the instruction registers being operable to store a plurality of the processing element instructions and to simultaneously output the processing element instructions stored in the instruction registers as a processing element microinstruction; and
- a multiplexer having a first input coupled to the output port of the decode memory device to receive the processing element microinstructions from the decode memory device, a second input coupled to the instruction registers to receive the processing element micro instructions output from the instruction registers, and an output coupled to the instruction input of each of the processing elements.

34. The computer system of claim 30 wherein the array control unit is further operable to generate an array control unit instruction along with each of the processing element instructions, the array control unit instruction controlling the operation of the array control unit.

35. The computer system of claim 30 wherein the array control unit further comprises:
- a program cache device containing a plurality of array control unit instructions, at least some of the array control unit instructions including an array control unit microinstruction and one of the processing element instructions, the array control unit microinstructions being passed to the array control unit to control the operation of the array control unit; and
- a cache control device that is operable to address the program cache device responsive to control signals from the array control unit, at least some of the control signals being responsive to the sequences of the array control unit commands to cause the cache control device to access a specific location in the cache control device where an array control instruction is stored.

36. The computer system of claim 35, further comprising a program port coupled to the program cache device, the program port receiving the array control unit instructions, and coupling the array control unit instructions to the program cache device to program the program cache device prior to operation of the array control unit.

37. The computer system of claim 30, further comprising a program port coupled to the decode memory device, the program port receiving the processing element microinstructions and coupling the processing element microinstruction to the decode memory device to program the decode memory device prior to operation of the array control unit.

38. A computer system, comprising:
a host processor having a processor bus;
at least one input device coupled to the host processor through the processor bus;
at least one output device coupled to the host processor through the processor bus;
at least data storage device coupled to the host processor through the processor bus; and
an active memory device, comprising:
a first control device receiving task commands from the host processor corresponding to respective active memory operations, the first control device being operable to generate either a respective set of memory commands or a respective set of processing commands responsive to each of the task commands;
a second control device coupled to receive the sets of the memory commands from the first control device, the second control device being operable to generate a respective set of the memory device instructions responsive to each of the sets of the memory commands;
a third control device coupled to receive the sets of the processing commands from the first control device, the third control device being operable to generate a respective set of the processing element instructions responsive to each of the sets of the processing commands;
a decode memory device coupled to receive the processing element instructions from the third control device, the decode memory device storing a plurality of processing element microinstructions and being addressed by the processing element instructions such that each of the processing element instructions accesses a location in the decode memory device where a respective processing element microinstruction is stored, each of the processing element microinstructions having a number of bits that is greater than the number of bits in the processing element instructions;
a memory device having a data bus containing a plurality of data bus bits, the memory device being coupled to second control device to receive the memory device instructions and couple write data to and read data from the memory device through the data bus responsive to the memory device instructions; and
an array of processing elements each of which is coupled a respective group of the data bus bits of the memory device data bus, each of the processing elements having an instruction input coupled to the third control device to receive the processing element microinstructions for controlling the operation of the processing elements.

39. The computer system of claim 38, wherein the decode memory device comprises a random access memory device.

40. The computer system device of claim 39, wherein the decode memory device comprises a static random access memory device.

41. The computer system device of claim 38, further comprising:
a plurality of instruction registers coupled to receive the processing element instructions from the third control device, the instruction registers being operable to store a plurality of the processing element instructions and to simultaneously output the processing element instructions stored in the instruction registers as a processing element microinstruction; and
a multiplexer having a first input coupled to the output port of the decode memory device to receive the processing element microinstructions from the decode memory device, a second input coupled to the instruction registers to receive the processing element micro instructions output from the instruction registers, the multiplexer being operable to couple either the first input or the second input to an output.

42. The computer system of claim 38 wherein the third control device is further operable to generate a control instruction along with each of the processing element instructions, the control instruction controlling the operation of the third control device.

43. The computer system of claim 38 wherein the third control device further comprises:
a program cache device containing a plurality of instructions, at least some of the instructions including a control unit microinstruction and one of the processing element instructions, the control unit microinstructions being passed to the third control device to control the operation of the array control unit; and
a cache control device that is operable to address the program cache device responsive to control signals from the third control device, at least some of the control signals being responsive to the control unit microinstruction to cause the cache control device to access a specific location in the cache control device where one of the instructions is stored.

44. The computer system of claim 43, further comprising a program port coupled to the program cache device, the program port receiving the instructions, and coupling the instructions to the program cache device to program the program cache device prior to operation of the third control device.

45. A method of controlling the operation of a memory device and an array of processing elements that are coupled to the memory device, the method comprising:
receiving a task command corresponding to an active memory operation;
generating either a set of array commands or a set of memory device commands responsive to the task command;
generating a respective set of processing element instructions responsive to each of the sets of the array commands;
generating a respective set of memory device instructions responsive to each of the sets of the memory device commands;
selecting a processing element microinstruction responsive to each of the processing element instructions, each of the processing element microinstructions having a number of bits that is greater than the number of bits in the corresponding processing element instructions;

controlling the memory device responsive to the memory device instructions; and controlling the processing elements in the array responsive to the processing element microinstructions.

46. The method of claim 45 wherein at least some of the processing element instructions comprise respective storage device addresses, and wherein the act of selecting a processing element microinstruction comprises:

storing the processing element microinstructions at respective addresses in a storage device; and using the processing element instructions to address the storage device.

47. The method of claim 46 wherein the act of storing the processing element microinstructions comprises storing the processing element microinstructions in the storage device prior to operation of the a memory device and processing elements based on the operations that are to be performed by the memory device or processing elements.

48. The method of claim 46, further comprising combining at least portions of a plurality of the processing element instructions and simultaneously outputting the combined processing element instructions as an extra length one of the processing element microinstructions.

49. A method of processing data, comprising:

receiving a task command corresponding to a processing operation;

generating a set of processing commands responsive to the task command;

generating a respective set of processing element instructions responsive to each of the sets of the processing commands;

selecting a processing element microinstruction responsive to each of the processing element instructions, each of the processing element microinstructions having a number of bits that is greater than the number of bits in the corresponding processing element instructions; and processing the data responsive to the processing element microinstructions.

50. The method of claim 49 wherein at least some of the processing element instructions comprise respective storage device addresses, and wherein the act of selecting a processing element microinstruction comprises:

storing the processing element microinstructions at respective addresses in a storage device; and using the processing element instructions to address the storage device.

51. The method of claim 49 wherein the act of storing the processing element microinstructions comprises storing the processing element microinstructions in the storage device prior to operation of the processing elements based on the operations that are to be performed by the processing elements.

52. The method of claim 49, further comprising combining at least portions of a plurality of the processing element instructions and simultaneously outputting the combined processing element instructions as an extra length one of the processing element microinstructions.

* * * * *